United States Patent [19]

Nakamura et al.

[11] Patent Number: 4,891,570
[45] Date of Patent: Jan. 2, 1990

[54] STATIC VAR COMPENSATOR WITH THYRISTOR CONTROL

[75] Inventors: Tomoharu Nakamura, Hitachi; Hiroyuki Irokawa, Machida; Syoichi Mashiko; Hidehiko Shimamura, both of Hitachi; Hirofumi Tsutsumi, Tokyo, all of Japan

[73] Assignee: Hitachi, Ltd., Tokyo, Japan

[21] Appl. No.: 127,904

[22] Filed: Dec. 2, 1987

[30] Foreign Application Priority Data

Dec. 5, 1986 [JP] Japan .................................. 61-288955
Dec. 9, 1986 [JP] Japan .................................. 61-293258
Jun. 2, 1987 [JP] Japan .................................. 62-138760

[51] Int. Cl.$^4$ ............................................. G05F 1/70
[52] U.S. Cl. ..................................... 323/210; 323/211
[58] Field of Search .................... 323/210, 211; 363/45

[56] References Cited

U.S. PATENT DOCUMENTS

| | | | |
|---|---|---|---|
| 4,377,833 | 3/1983 | Udren | 323/211 |
| 4,395,674 | 7/1983 | Kelley | 323/210 |
| 4,472,674 | 9/1984 | Yano et al. | 323/210 |
| 4,680,531 | 7/1987 | Rey et al. | 323/210 |
| 4,811,236 | 3/1989 | Brennen et al. | 323/210 |

FOREIGN PATENT DOCUMENTS 167015 8/1985 Japan .................................. 323/210

Primary Examiner—William H. Beha, Jr
Attorney, Agent, or Firm—Antonelli, Terry & Wands

[57] ABSTRACT

A static var compensator which includes a transformer with one end connected to an electric power system and a series circuit constituted by a reactor and a thyristor bulb connected between the other end of the transformer and ground. A voltage detection device detects the voltage of the electric power system and the output of the voltage detection device is sample an even number of times for every cycle of the voltage. A register is provided for storing sampled values an adder is provided for adding absolute values of the sampled values stored in the register. A firing angle of the thyristor bulb is controlled by a control device in accordance with a deviation of an output of the adder from an output of a voltage setting device. A deviation deriving device obtains a deviation of an output of the control device from a predetermined value corresponding to a present var, and an output of the deviation deriving devices is fed back to an input side of the control device.

3 Claims, 10 Drawing Sheets

STATIC VAR COMPENSATOR WITH THYRISTOR CONTROL

BACKGROUND OF THE INVENTION

1. Field of the Invention

The present invention generally relates to a compensator for reactive power (hereinafter referred to as "var") provided in an electric power system, and particularly relates to a static var compensator made up of static devices such as thyristors or the like.

2. Description of the Prior Art

At various points in an electric power system, there are provided devices for controlling voltages/var to predetermined values so as to allow the electric power system to operate stably. For example, in a power station, there is provided an automatic voltage control apparatus for making a terminal voltage of the power station constant. In a substation in a neighborhood of customers, there is provided a voltage/var control apparatus constituted by phase modifying equipment such as a tapped transformer, a static capacitor, a reactor and the like so as to control the voltage at the customers locations is that it is constant or to reduce the transmission loss in the electric power system. In such conventional phase modifying equipment, however, there have been disadvantages in that only stepwise control can be performed because the equipment is connected to an electric power system through a mechanical switch, and the equipment is unsuitable for use in a major electric power system because its capacity cannot be made large. In order to eliminate the foregoing disadvantages, recently, various static devices using a thyristor bulb suitable for use in a major electric power system have been used practically.

These devices, however, have a large effect on an electric power system because of their large capacity, and therefore it is necessary to make these devices contribute to the stable operation of the electric system. For example, in a static var compensator provided in a major electric power system, var cannot be detected so as to be directly controlled unlike a static var compensator provided in a terminal substation of the electric power system. Therefore var is indirectly controlled such that a voltage at the point where the var compensator is provided is detected and the detected voltage is controlled to a predetermined value. It is known that higher harmonics (particularly, the second-order higher harmonics) are superimposed on the voltage of the electric power system. In the static var compensator provided in a major electric power system, control is performed so that a deviation of a detected value of a voltage, the mean value of which is affected by the higher harmonics from a predetermined setting voltage, is derived, and a firing angle of a thyristor bulb is controlled through a voltage control circuit having a high control gain, so that in opposition to an expected object, the var becomes large. A static compensator with large capacity, however, does not have the disadvantages as described above. Further, upon occurrence of a fault in an electric power system, a terminal voltage of the static var compensator is lowered so that the thyristor bulb cannot be fired. It is therefore desirable that when a breaker is opened (or the fault is removed), the control function of the static var compensator is rapidly restored so as to reduce over-voltage of the electric power system which is generated when the fault is removed.

The large-capacity static var compensator (hereinafter, simply abbreviated to "SVC") of the kind as described above is disclosed, for example, in NISSIN ELECTRIC TECHNICAL REPORT, Vol. 28, No. 3, 1983, or in Article entitled "Simulator Test for Stabilizing System by SVC using Digital Control Apparatus" (PAPERS OF TECHNICAL MEETING ON POWER ENGINEERING, July 25, 1985 (PE-85-7 IEE JAPAN)).

The conventional SVC controlling method executed when a fault is generated in an electric power system is such that the equipment is stopped or an output for controlling the equipment is made to be zero (see the above Article, page 65, lines 6-7), and the point that the equipment is continuously operated to the utmost so as to maintain the electric power system has never been taken into consideration. Further, any reference fails to disclose the influence by the higher harmonics.

SUMMARY OF THE INVENTION

The present invention relates to a large capacity static var compensator, and therefore an object of the present invention is to provide a static var compensator which can contribute the utmost to the stable operation of an electric power system and which can operate properly.

In order to attain the above object, in a static var compensator having a transformer with one end connected to a power electric power system, and a series circuit constituted by a reactor and a thyristor bulb connected between the other end of the transformer and ground, the control apparatus for controlling the static var compensator according to the present invention comprises: a voltage detection means for detecting a voltage of the electric power system; a harmonic deletion means for deleting at least the second harmonics from an output of the voltage detection means; and a control means for controlling a firing angle of the thyristor bulb in accordance with a deviation of an output of the harmonic deletion means from an output of a setting device.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

Figure 1:
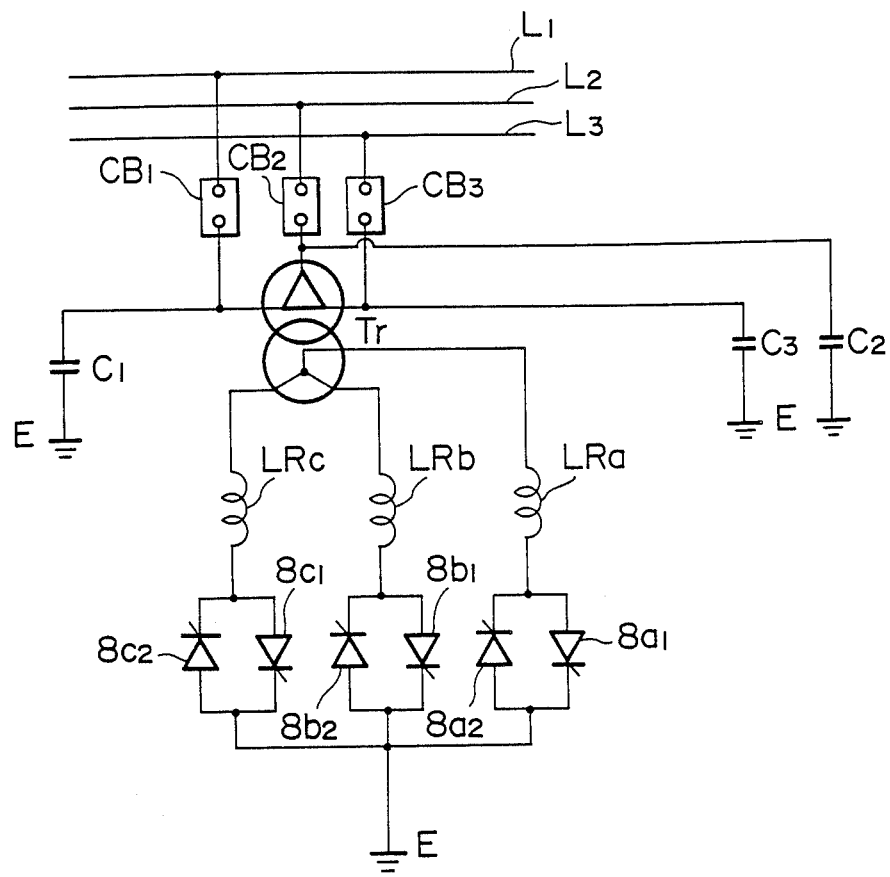
FIG. 1 is a schematic diagram showing a static var compensator to which the control apparatus according to the present invention is applied.

FIG. 1 is a three-phase connection diagram of a generally-used SVC. In the drawing, the winding of a transformer $T_r$ of the SVC at the electric power system side are connected to three-phase electric power system lines $L_1$, $L_2$ and $L_3$ through breakers $CB_1$, $CB_2$, and $CB_3$ respectively, and, the windings of the transformer $T_r$ at the SVC side are connected to ground E through reactors $LR_a$, $LR_b$, and $LR_c$ and three groups of thyristors $8a_1$ and $8a_2$, $8b_1$ and $8b_2$, and $8c_1$ and $8c_2$, respectively connected in anti-parallel fashion. Further, capacitors $C_1$, $C_2$ and $C_3$ may be provided between ground E an the respective junctions of the transformer $T_r$ and the breakers $CB_1$, $CB_2$, and $CB_3$.

Figure 2:
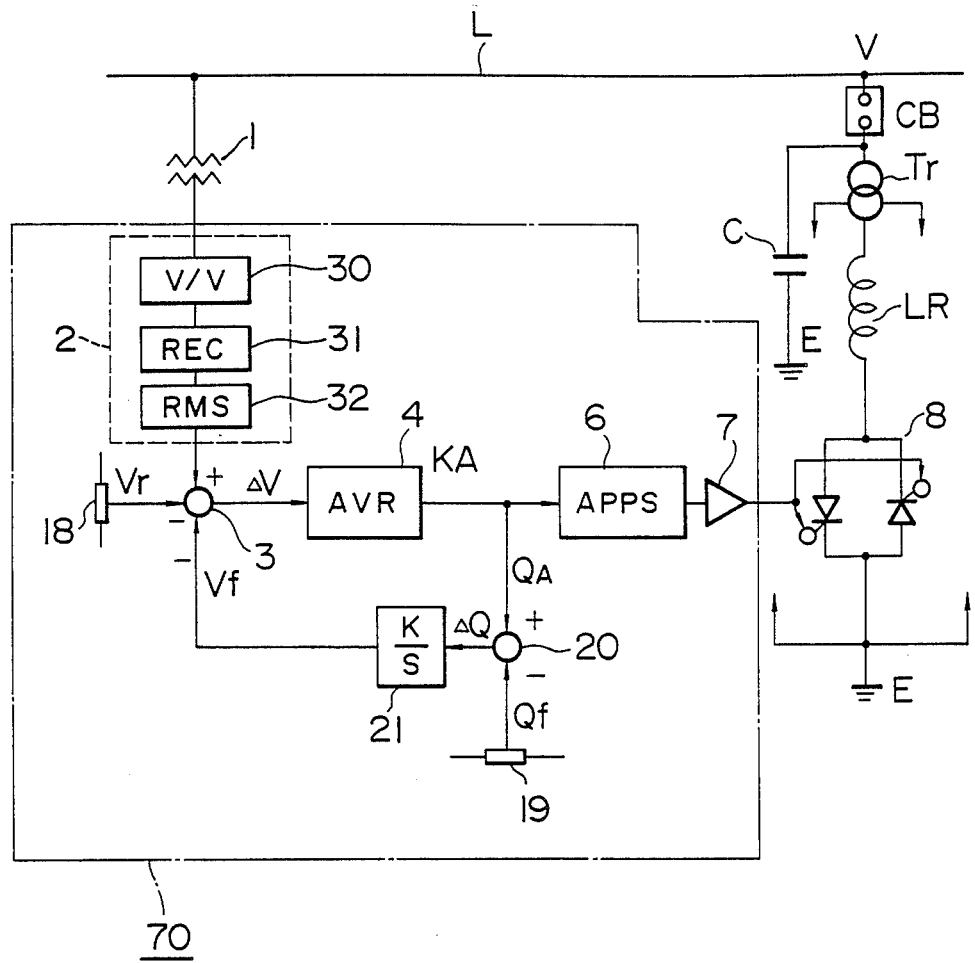
FIG. 2 is a schematic diagram showing an embodiment of the SVC control apparatus according to the present invention.

FIG. 2 shows an embodiment of the control apparatus according to the present invention for controlling the SVC of FIG. 1. The phases of the SVC are symmetrically controlled with each other, and therefore only the control apparatus and the SVC for one representative phase will be described and illustrated hereunder.

In FIG. 2, a system voltage V of a power transmission line L is taken into a voltage detection circuit 2 in an SVC control apparatus 70 through a voltage transformer 1. In the voltage detection circuit 2, the system voltage is converted by a voltage conversion circuit 30 into a voltage level suitable for processing in the control apparatus 70, rectified by a full-wave rectification circuit 31, and converted by an effective value conversion circuit 32 into an effective value (or a peak value). The thus converted system voltage is compared in a subtracter 3 with a voltage setting value $V_r$ formed in a voltage setting device 18, and a difference in voltage $\Delta V$ between the system voltage and the voltage setting value $V_r$ is applied to a voltage control circuit 4. The output of the voltage control circuit 4 is converted by an automatic phase shifter 6 into a pulse having a phase corresponding to the output of the voltage control circuit 4, and the pulse thus obtained is applied to a thyristor bulb 8 as a firing pulse through a pulse amplifier 7. The SVC control apparatus 70 is arranged basically as described above, and other circuit portions thereof will be described later. Further, a system voltage signal (not shown) is led into the automatic phase shifter 6 as a synchronizing signal. In the foregoing basic circuit arrangement, as the system voltage V rises, the deviation voltage $\Delta V$ becomes large and the output of the voltage control circuit 4 also becomes large. As a result, the thyristor bulb 8 is controlled so as to increase a lagging var flowing in the reactor LR to thereby lower the system voltage V. When the system voltage V falls, on the contrary, the thyristor bulb 8 is controlled by an operation opposite to that in the foregoing case so as to reduce the var flowing in the reactor LR to thereby cause the system voltage V to rise. Such a capability of reducing a voltage fluctuation of the SVC increases as a forward gain KA of the voltage control, circuit 4 increases. Generally, this gain is set in the tens, and therefore the SVC control apparatus 70 sensitively responds even to a slight fluctuation in the system voltage.

Description has been made as to the phenomenon that the SVC control apparatus makes the electric power system unstable when higher harmonics are mixed into the electric power system voltage because the forward gain KA of the voltage control circuit 4 is high. The phenomenon will be described more in detail with reference to FIGS. 3A and 3B.

Figure 3A:
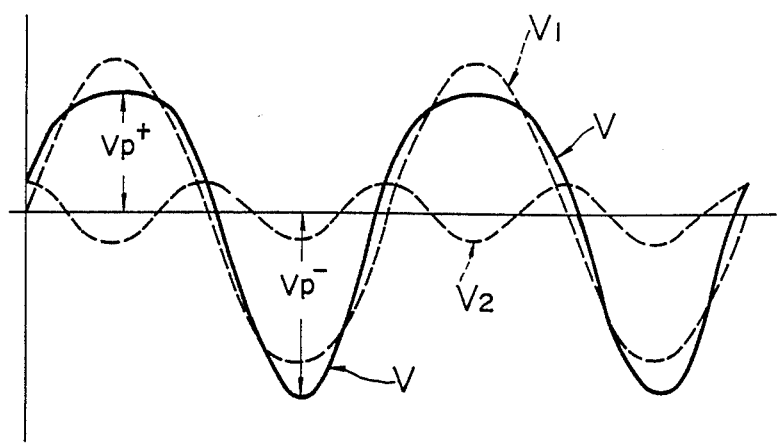
FIGS. 3A and 3B are diagrams for explaining the problems in the prior art.
Figure 3B:
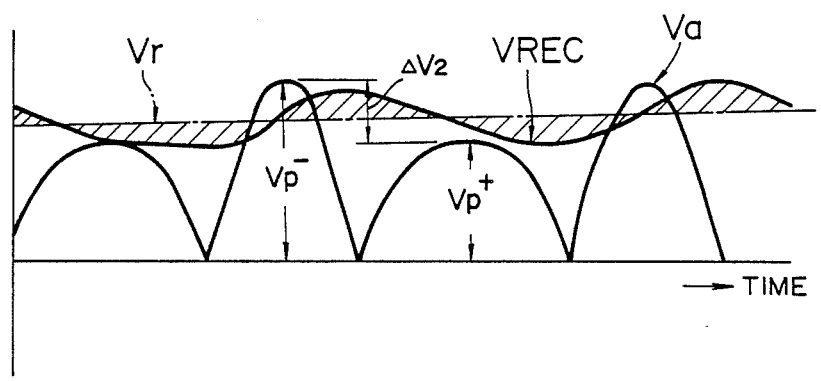

The higher harmonics are ordinarily contained in the system voltage, and the content of low-order higher harmonics is increased particularly by the provision of phase-advancing compensation capacitors. As shown in FIGS. 3A and 3B even-order higher harmonic components in those higher harmonics may act on a fundamental wave with peak values different from each other between positive and negative half waves. That is, as shown in FIG. 3A, in the case where a second-order higher harmonic component $V_2$ is contained in a fundamental wave component $V_1$ with a phase as shown in the drawing, there occurs a case where the negative peak value $V_p^-$ of the system voltage $V = V_1 + V_2$ (shown by a solid line curve) becomes larger than the positive peak value $V_p^+$ of the same system voltage. In this condition, if the system voltage V is taken into the voltage detection circuit 2, rectified by the full-wave rectification circuit 31 (the rectified waveform $V_a$), and then smoothed, such a ripple is generated in the fundamental wave component as shown in FIG. 3B by $V_{REC}$, so that the output $\Delta V$ (a hatched portion in FIG. 3B) of the subtracter 3 is oscillated by the fundamental wave component to thereby make the output of the SVC oscillate. For example, when the second-order higher harmonics are contained by 0.5% and the forward gain of the voltage control circuit 4 is 20, $\Delta V_2 (= V_p^- - V_p^+)$ in FIG. 3B becomes 1% of the amplitude of the fundamental wave $V_1$, and therefore the conversion output may have an amplitude of 20% of that of the fundamental wave $V_1$. In certain system conditions, such a fluctuation may cause control to become unstable.

In order to eliminate the influence of the even-order higher harmonics, generally known is a method in which a band pass filter is provided, a method in which a time constant of the rectifying circuit is made sufficiently large, and so on. Those methods, however, are not preferable because detection time is prolonged and therefore the response of the whole SVC system is deteriorated.

According to the present invention, taking into consideration the fact that the ripple of the rectification output, generated in the case where the even-order higher harmonic components are contained in the system voltage, has a cycle equal to one cycle or a fraction of an integer of one cycle of the fundamental wave of the system voltage, the ripple component can be perfectly smoothed so that the ripple is eliminated through the integration of the rectification output for one cycle of the fundamental wave, and the time taken for the integration is sufficiently small so that the delay in response of the SVC can be made sufficiently small.

Figure 4:
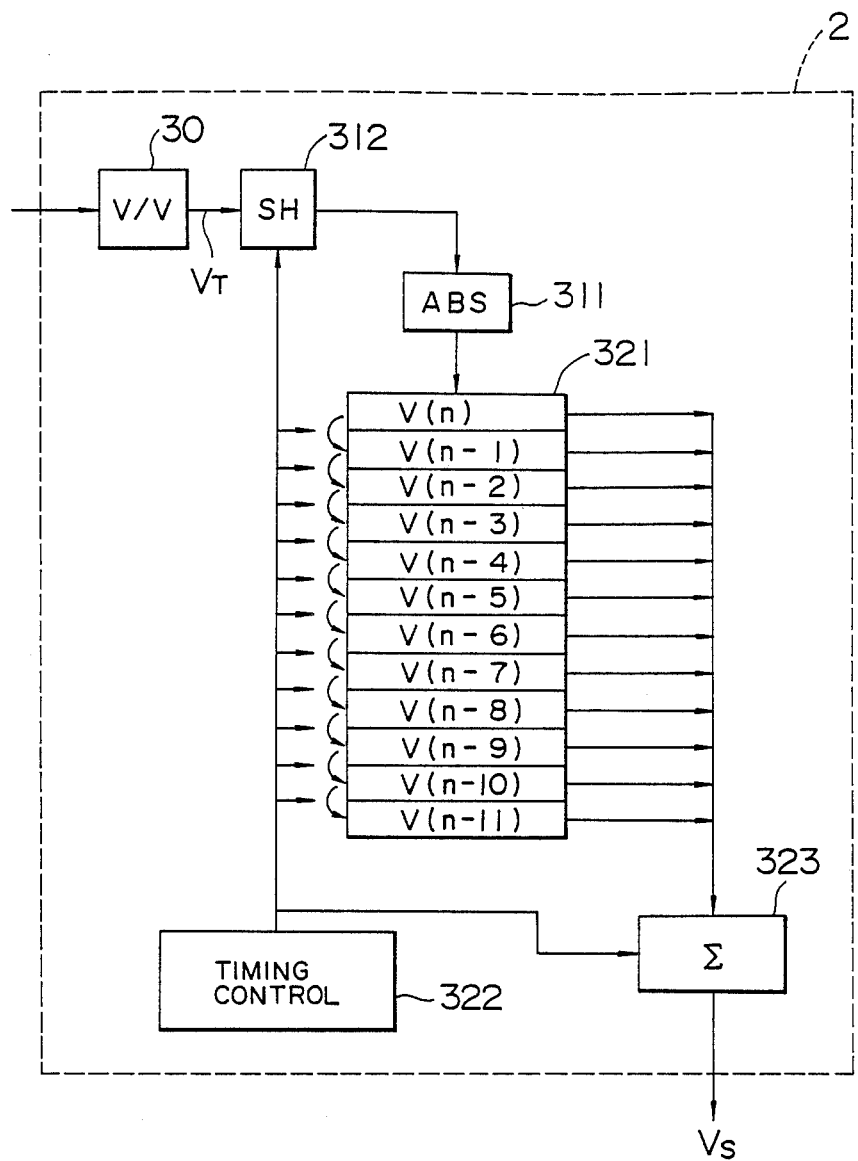
FIG. 4 is a diagram showing an embodiment of the voltage input portion of the SVC control apparatus according to the present invention.

According to the present invention, it is possible to solve the foregoing problem by improving the arrangement of the voltage detection circuit 2. In FIG. 4, therefore, a voltage detection circuit 2 is illustrated as an embodiment of the present invention. In this circuit 2 of FIG. 4, it may be considered that portions 311 and 312, and portions 321, 322, and 323 correspond to the full-wave rectification circuit 31 and the effective-value conversion circuit 32 of FIG. 2, respectively. In FIG. 4, the voltage detection circuit 2 is constituted by a voltage conversion circuit 30, a sample holder 312, a full-wave rectification circuit or an absolute value circuit (ABS) 311, a buffer register 321, a timing circuit 322, and an adder 323.

Figure 5A:
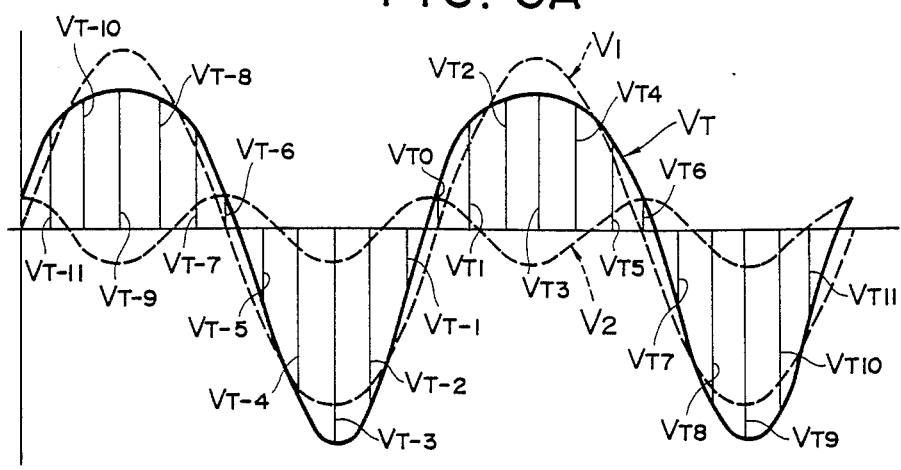
FIGS. 5A through 5D are diagrams for explaining the operation of the voltage input portion of FIG. 4.
Figure 5B:
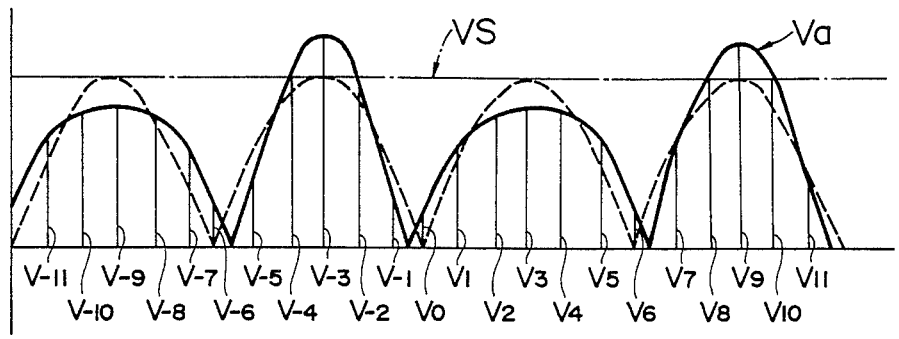
Figure 5C:
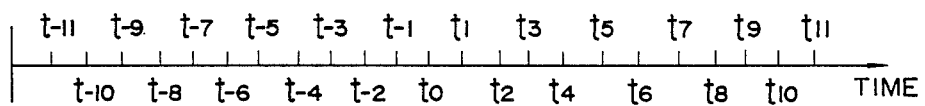
Figure 5D:
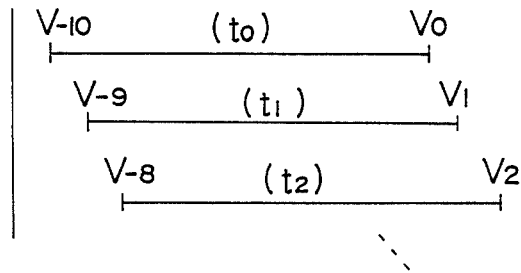

In this circuit arrangement, first, the output $V_r$ of the voltage conversion circuit 30 is taken into the sample/holder 312, for example, through sampling every 30 degrees in terms of electric angles of the fundamental wave component of the system voltage. The thus taken-in voltage signal is composed of instantaneous values $V_{T-11}$ through $V_{T11}$ obtained by sampling the waveform $V_T$ indicated by a solid line in FIG. 5A every 30 degrees. FIG. 5A shows the case where the second-order higher harmonic component is superimposed on the system voltage $V_T$ in quite the same phase relation so that in the case of FIG. 3A. Next, the absolute values $V_{-11}$ through $V_{11}$ (see FIG. 5B) of the sampled values of the taken-in voltage signal are obtained by the absolute value circuit 311, and the output of the absolute value circuit 311 is applied to the n-th register of the buffer register 321 as V(n). Prior to the application of the output of the absolute value circuit 311 into, the n-th register, replacement of data stored in the register is performed successively one by one from the oldest data example, the data in the (n−11)-th register is displaced into the (n−10)-th register, the data in the (n−10)-th register is displaced into the (n−9)-th register, ..., and the data in the n-th register is displaced into the (n−1)-th register so as to make the n-th register vacant for storing the newest information. The buffer register 321 has twelve registers, and therefore if twelve data samples are obtained by sampling the output of the voltage conversion circuit 30 every 30 degrees, that is, V(n−1), V(n−10), ..., V(n), have been stored in the buffer register 321 as described above, data for one cycle of the system voltage fundamental wave has been obtained. Those data correspond to values obtained by sampling a waveform $V_a$ shown by a solid curve in FIG. 5B. FIG. 5C shows sampling time t of the voltage waveform. Successively sampled data are stored in the twelve registers 321 of FIG. 4 respectively, as shown in FIG. 5D. Specifically, for example, the twelve data $V_{-11}$ through $V_0$ are stored at the time $t_0$, the twelve data $V_{-10}$ through $V_1$ are stored at the time $t_1$, and the twelve data $V_{-9}$ through $V_2$ are stored at the time $t_2$. In this case, it is important that the data V(n) taken into the n-th register for the newest information has the same value as that of the data V(n−11) discharged from the (n−11)-th register for the oldest information, and this relation is kept unless the applied voltage changes in amplitude or phase. This is apparent from the fact that the newest and the oldest data correspond to instantaneous values having a phase difference of 360 degrees (30 degrees×12) in terms of electric angles of the system voltage. Thus, the sum of twelve data stored in the registers is always kept fixed because the same value is always added to and simultaneously subtracted from the sum, and therefore it will be understood that the system voltage is not influenced by the intermixing of the second-order higher harmonics. Consequently, if the sum of data for this one cycle is obtained by the adder 323 and if the output $V_s$ of the adder 323 is multiplied by a suitable coefficient, it is possible to obtain an integrated value of the voltage $V_s$ for cycle, that is, an effective value of the voltage $V_s$. Even if the rectification output, that is, the system voltage $V_s$, is affected by even-order higher harmonic components such as the second-order higher harmonic component, the fourth-order higher harmonic component, etc., no ripple component of the system voltage appears in the foregoing integration value $V_s$ because the ripple component is a periodic wave having the same cycle as that of the fundamental wave, and therefore it is possible to perform stable var control. Further, this integrating time (for one cycle of the fundamental wave) is sufficiently small for eliminating the ripple component that the delay in response of the SVC can be minimized.

In this embodiment, however, when other higher harmonic components, that is, odd-order higher harmonic components, are contained, those components cannot be eliminated, so that the detected voltage value $V_s$ may be slightly shifted from the effective value of the fundamental wave component. The SVC itself, on the other hand, is not provided for controlling the absolute value of the system voltage but mainly for reducing fluctuations in the system voltage. Accordingly, in the embodiment of FIG. 2, in addition to the foregoing arrangement, there are provided a setting device 19 for prescribing the mean output of the SVC, a subtracter 20 for comparing the output $Q_f$ of the setting device 19 with an actual output $Q_A$ of the voltage control circuit 4, and an integrator 21 for integrating the output of the subtracter 20. In this arrangement, a difference between the output $Q_A$ of the voltage control circuit 4 and the output $Q_f$ of the setting device 19 is obtained by the subtracter 20, the deviation $\Delta Q$ of the output $Q_A$ from the output $Q_f$ is integrated by the integrator 21, and the output of the integrator 21 is subtracted from the voltage setting value $V_r$, so that the voltage setting value $V_r$ is compensated so as to always make the deviation $\Delta Q$ approach zero. The influence of the DC component error in the output of the voltage detection circuit 2 can be eliminated by maintaining the error by always maintaining the average output of the SVC to a value in the vicinity of the given setting level $Q_f$ as described above.

In this embodiment, even in the case where low-order higher harmonics, particularly, the second-order higher harmonics, are contained in the system voltage, voltage detection with no ripple can be performed without generating a large delay in voltage detection, and therefore the SVC can be caused to operate stably and surely.

Figure 6:
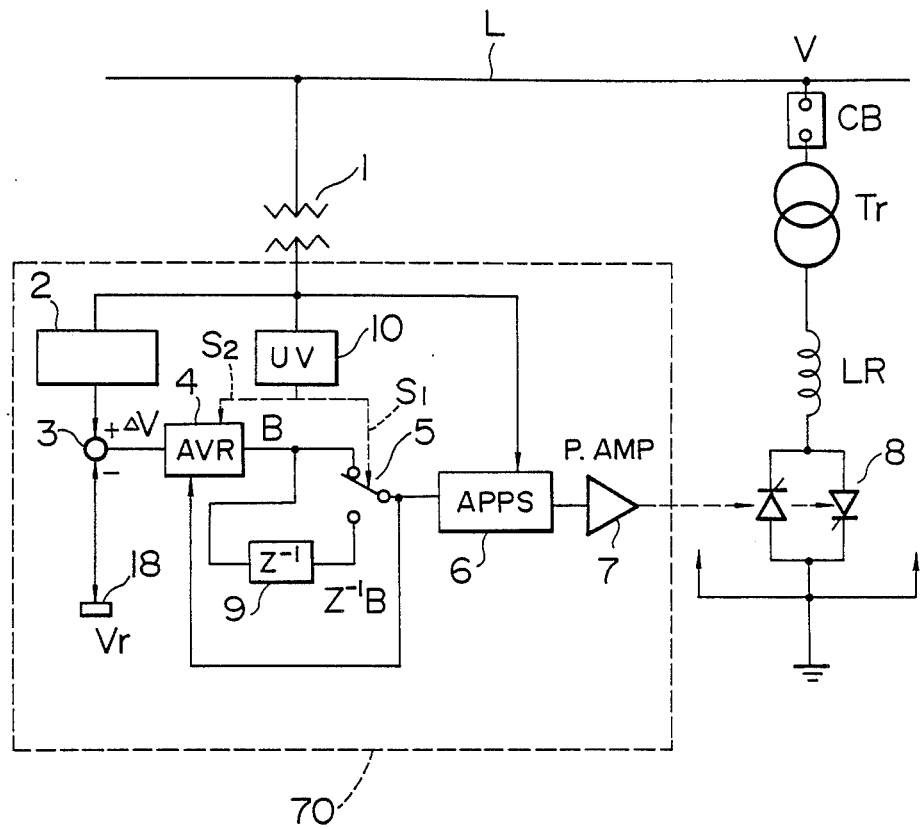
FIG. 6 is a diagram showing an embodiment of the SVC control apparatus according to the present invention in which the restarting can be rapidly performed.

In a large-capacity SVC provided in a major electric power system, the response after a fault has been generated is significant for the stabilization of the system. Next, a method of improving the response will be described. FIG. 6 is a diagram of an embodiment of the present invention for briefly explaining the method. In this embodiment of FIG. 6, there are provided a fault detection circuit for detecting a fault in an electric power system, a holder for holding a control output value of an automatic voltage regulator in the normal state of the electric power system, an output change-over circuit for changing-over the control output from the output of the automatic voltage regulator into the output of the holder in response to the detection signal of the fault detection circuit upon generation of a fault and for changing-over the control output from the output of the holder into the control output from the automatic voltage regulator again after removal of the fault, and an input change-over circuit for applying the output of the holder at that time to the automatic voltage regulator simultaneously with the change-over operation of the output change-over circuit upon generation of a fault and for switching the output of the holder into the detected value of the system voltage after removal of the fault.

In this arrangement, upon generation of a fault, the control output value to be supplied to the SVC is changed-over by the output change-over circuit from the control output from the voltage control circuit (AVR) into the output of the holder, so that the SVC is controlled on the basis of the output of the holder (that is, the control output in the normal state). Although the control output to be supplied to the SVC is changed-over by the output change-over circuit from the output of the holder into the output of the AVR again upon removal of the fault, the control output used at the time of the control initiation is the same as that used upon generation of the preceding fault (that is, the output of the holder). As a result, it is possible to make the difference between the input signal to the AVR, upon removal of the fault and the system voltage be considerably small. Therefore overvoltage and an electric power fluctuation can be effectively reduced.

Next, an embodiment of the present invention will be described with reference to the accompanying drawing. FIG. 6 shows an embodiment of the SVC control apparatus according to the present invention in the case where AVR (constant voltage) control is performed as the most representative control system for controlling the SVC. In the normal state, a system voltage is taken into a voltage detection circuit 2 through a voltage transformer 1 and converted into a level which is made to agree with that of a signal of a control apparatus 70, and a difference between the converted voltage and a voltage setting value $V_r$ is obtained by a subtracter 3, and a deviation of the system voltage from the setting value $V_r$ is applied to an AVR 4. The AVR 4 is arranged to determine the SVC output in accordance with the output of the subtracter 3 (that is, a deviation $\Delta V$ of an actual voltage from a setting value). Ordinarily, as the AVR 4, a first-order delay circuit is used. A change-over circuit 5 is arranged so as to select the output of the AVR 4 in the normal state and applies the output to a firing phase control circuit APPS 6. The APPS 6 is arranged to convert this output into a pulse in accordance with the output B of the AVR 4 so as to control thyristors 8 through a pulse amplifier 7. Then, in this embodiment, the output B of the AVR 4 is further taken into a storage circuit 9 and held for a predetermined period of time T (for example, for a half cycle). Therefore, the output $Z^{-1}B$ of the storage circuit 9 is always held to be the output of the AVR 4 a predetermined time T before. As the storage circuit 9, a sample/hold circuit is used. When a fault is generated in the system, an undervoltage relay 10 is actuated so that the change-over circuit 5 is switched to select the output of the storage circuit 9.

In the thus arranged SVC control apparatus 70, in the normal operating state (a section I), the system voltage is made constant, and also the output B of the voltage control circuit 4 is fixed at the value $B_1$. When a system fault is generated in this state, the system voltage is abruptly lowered, and the voltage control circuit 4 reduces the output B thereof in response to a signal representing $V_r > V$ so as to reduce a lagging var fed from the SVC through the firing phase control circuit 6 to thereby raise the system voltage V. That is, when the measure described later according to the present invention is not executed, in a system fault section II, the output of the voltage control circuit 4 continuously decreases as shown by $B_0$ in FIG. 7C. The undervoltage relay 10, on the other hand, detects generation of a fault and produces a detection output signal $S_1$ at a point in time $t_1$ which has elapsed from a point in time $t_0$ upon generation of the system fault by a slightly short time $T_D$ taken for the signal detection. In response to the detection signal $S_1$ of the undervoltage relay 10, the switch 5 switches the circuit from the voltage control circuit 4 at that time to the storage circuit 9 side. The output B $(=B_1)$ of the voltage control circuit 4 in the normal state is stored in the storage circuit 9, and thereafter the signal $B_1$ is applied to the automatic phase shifter 6 so as to apply a pulse signal corresponding to the signal $B_1$ to the thyristors 8 of SVC. As shown by $B_0$ in FIG. 7C, the response of the AVR 4 upon generation of a system fault becomes lower in accordance with a delay time constant of the AVR 4 after the voltage has fallen. The detection delay $T_D$ exists in the undervoltage relay 10, and it will do to set the storage time of the storage circuit 9 to satisfy the inequality:

$T > T_D$.

Figure 7A:
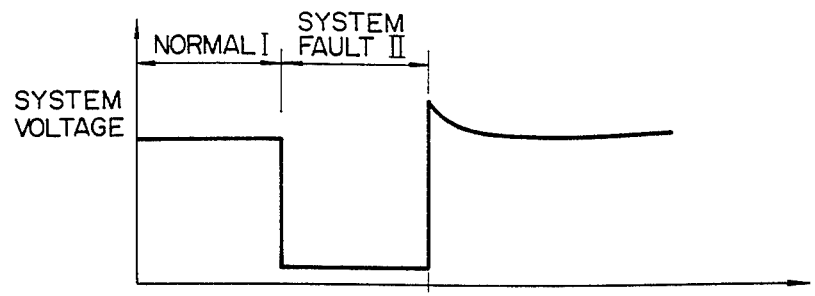
FIGS. 7A through 7C are diagrams for explaining the operation of the SVC control apparatus of FIG. 6.
Figure 7B:
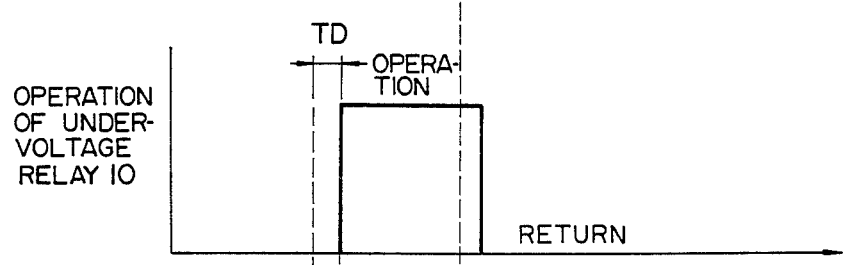
Figure 7C:
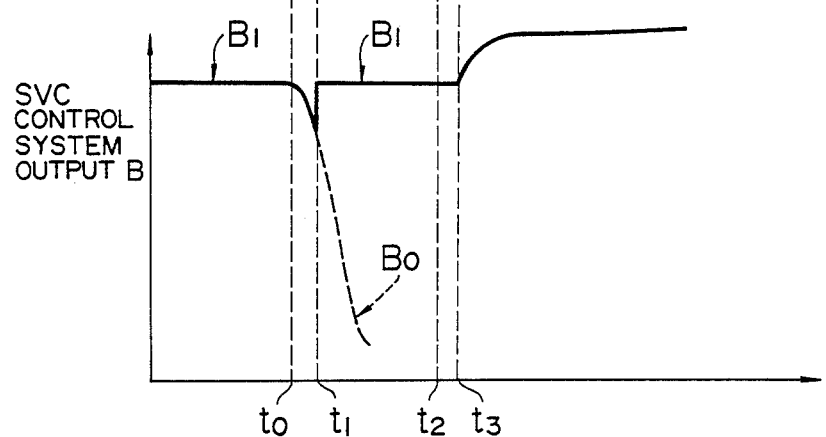
Figure 8:
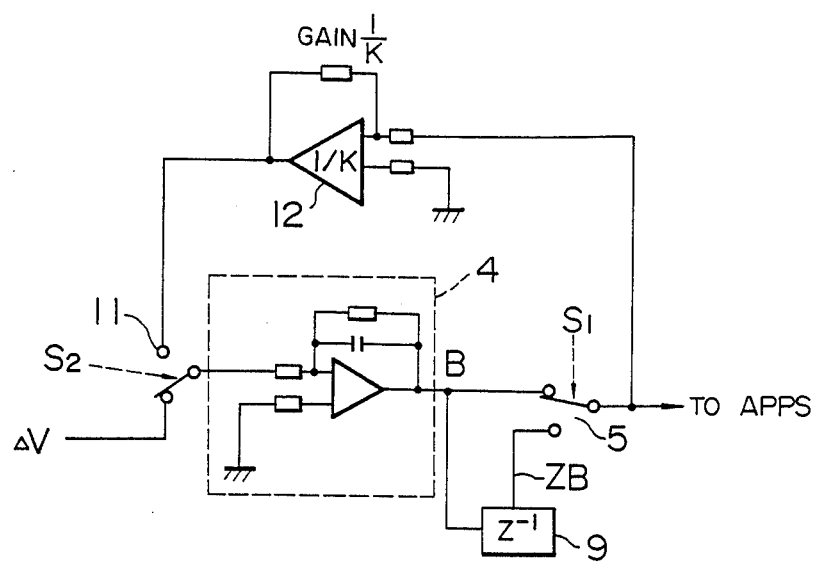
FIG. 8 is a diagram showing the main part of the circuit of FIG. 6.

At the same time as the switch 5 is changed over to the storage circuit 9 side, an initial value of the AVR 4 is changed over in accordance with the output $S_2$ of the undervoltage relay 10 so as to coincide with the output of the storage circuit 9. To this end, such a method as shown in FIG. 8 may be used. In FIG. 8, a change-over switch 11 is provided in the input circuit of the AVR 4. The change-over switch 11 has two inputs, one being connected to the output $\Delta V$ of the subtracter 3 and the other being connected to receive a value (1/K) obtained by dividing the output of the storage circuit 9 by an AVR gain by a feedback amplifier 12. When the change-over switch 11 for changing-over the input circuit of the AVR 4 is switched to the output side of the feedback amplifier 12 in response to the fault detection output $S_2$, the output of the AVR 4 becomes equal to the value of the output $Z^{-1}B$ of the storage circuit 9 because the output of the storage circuit 9 is selected by the switch 5. Accordingly, the initial value of the AVR 4 can be made to be the output $Z^{-1}B$. Further, in response to the fault detection signal, the storage circuit 9 can be made to stop the taking-in of the output of the AVR 4 and held to a fixed value before generation of the fault. By the foregoing operation, during a system fault, the control output to be produced to the SVC is held at a value before fault generation as shown in FIG. 7C.

Figure 9:
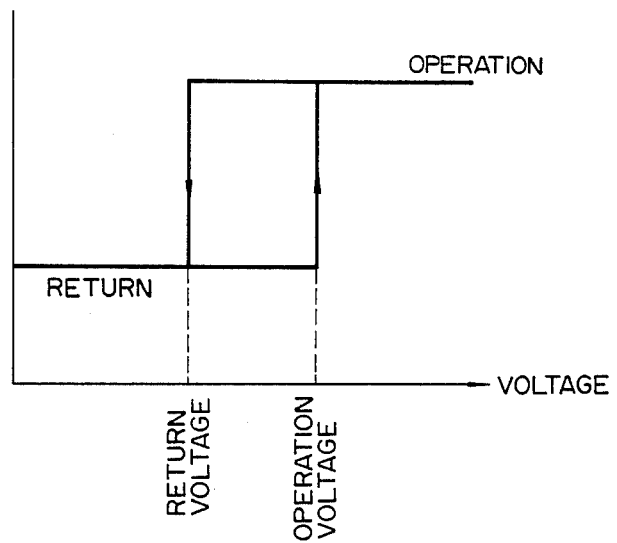
FIG. 9 is a diagram showing the preferred characteristics of the undervoltage relay of FIG. 6.

A fault generated in the electric power system, on the other hand, is detected by a protective relay (not shown), and breakers at both ends of the fault generation section are opened so as to remove the fault. The fault is removed at the point in time $t_2$, and at this moment the system voltage leaps up to a value higher than the voltage in the normal state before the fault generation. The reasons why the voltage leaps may be considered. One of the reasons is that upon generation of a fault in an electric power system, various apparatus (mostly reactive components) at the load side are cut off and separated from the system, for example, for the protection of the equipment. However, it takes a long time to cut off static capacitors of the phase modifying equipment so that this measure is not useful for control in an emergency. In this case, in the fault-removed condition (after the time $t_2$), the lagging var is decreased by a degree corresponding to the cut-off load in comparison with the state before fault generation, and this is equivalent to the increase of the leading var, so that voltage rising is caused as described above. In voltage rising, the undervoltage relay 10 detects the voltage rising at the point in time $t_3$ with a delay for detection and stops to produce the signals $S_1$ and $S_2$, so that the switches 5 and 11 are returned to the positions in the normal state I. At this time, the output of the AVR 4 has already recovered to a value before fault generation in the system, and therefore the control output can be rapidly returned to a proper value as shown in FIG. 7C even if an overvoltage is generated in the system. Further, in the case where the system voltage falls to a value approximate to the setting value of the undervoltage relay 10, unnecessary operations of the change-over switches 5 and 11 are repeated. Accordingly, it is effective to make the undervoltage relay 10 have hysteresis characteristics as shown in FIG. 9. In the foregoing embodiments, it is possible to eliminate a delay in control in the SVC after a system fault has been removed.

Figure 10:
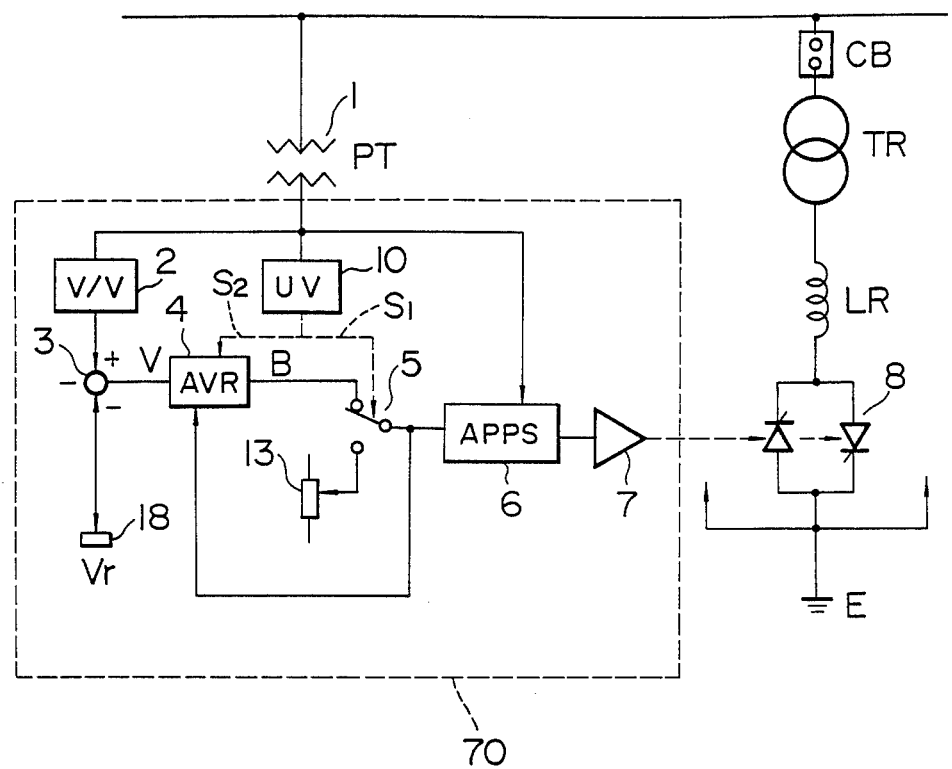
FIGS. 10 and 11 are diagrams showing other embodiments of the SVC control apparatus according to the present invention.

Next, referring to FIG. 10, another embodiment of the present invention will be described.

In this embodiment, as the control output holder, a setting device 13 in which the mean output quantity of the SVC is set is used in place of the output storage circuit 9. That is, by the operation of an undervoltage relay 10 upon generation of a system fault, a switch 5 is switched in response to a signal $S_1$ so as to make the control output equal to the set value of the setting device 13, and at the same time an input changeover circuit (not-shown) of the AVR 4 is switched by a signal $S_2$ so as to make the control output equal to a value (1/K) obtained by dividing the output of the setting device 13 by a gain of the AVR 4, so that the initial value of the AVR 4 is made equal to the set value of the setting device 13. The other operation is performed in the same manner as the case of FIG. 6. This embodiment is effective for an apparatus having a such that the mean output of the SVC is normally made equal to a certain preset value, and it will do to use the mean output setting value as the preset value.

Figure 11:
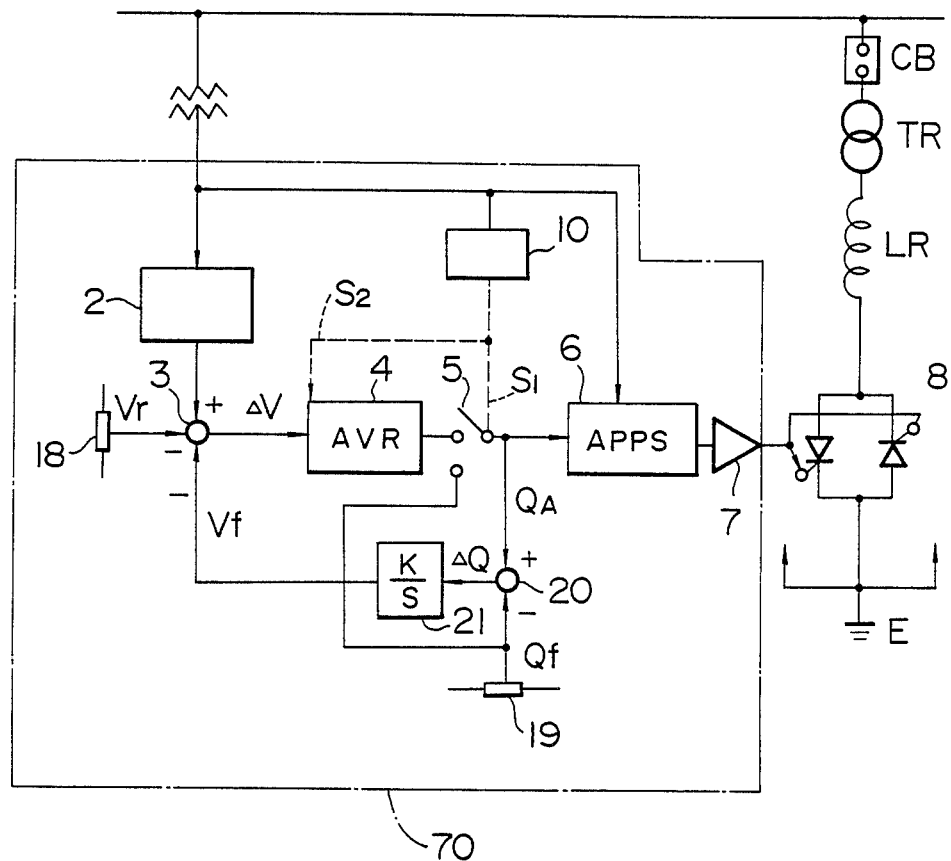

Although description has been made about the embodiments in which the storage circuit (in FIG. 6) is used, and the mean output setting device 13 (in FIG. 10) is used as the control output holder, the present invention is not limited to those embodiments but can be applied to an SVC control apparatus using a float control system as shown in FIG. 2. FIG. 11 shows an embodiment in which the present invention is applied to the SVC control apparatus using a float control system. The float control system is arranged such that a system voltage is compared with a reference value $V_r$ so that firing of thyristors 8 is controlled on the basis of the value of a deviation $\Delta V$ of the system voltage from the reference value $V_r$ in order to make the deviation $\Delta V$ be zero. The reference value $V_r$ is compared with a signal $Q_A$ corresponding the the deviation $\Delta V$ so that the reference voltage $V_r$ is changed in accordance with a deviation $\Delta Q$ of the reference value $V_r$ from the signal $Q_A$. In the case where the present invention is applied to the float control system, an output $Q_f$ of a float setting device 14 may be used in place of the storage value $(Z^{-1})$ of FIG. 1.

According to the present invention, there is an advantage in that the control system can rapidly respond after removal of a system fault so that an overvoltage and an electric power fluctuation after removal of the fault can be sufficiently suppressed. This point has been a problem in operating the system. Particularly, in suppression of electric power fluctuation after fault removal, the suppression capability immediately after fault removal is important. In this regard, the present invention has a particularly remarkable effect.

We claim:

1. A static var compensator control apparatus having a transformer with its one end connected to an electric power system, and a series circuit constituted by a reactor and a thyristor bulb and connected between the other end of said transformer and ground, a control apparatus for controlling said static var compensator comprising:
    a voltage detection means for detecting a voltage of said electric power system;
    a harmonic deletion means for deleting at least the second harmonics from an output of said voltage detection means, in which said harmonic deletion means is constituted by a sampling means for sampling the output of said voltage detection means an even number of times for every cycle of said voltage, a register for storing sampled values of the most recent cycle in an output of said sampling means, and an adder means for adding absolute values of the samples values in one cycle stored in said register; and
    a control means for controlling a firing angle of said thyristor bulb in accordance with a deviation of an output of said harmonic deletion means from an output of a setting device.

2. A static var compensator control apparatus according to claim 1, further comprising a deviation deriving means for obtaining a deviation of an output of said control means from a predetermined value corresponding to a preset var, and a feedback means for feeding-back an output of said deviation deriving means to an input side of said control means.

3. In a static var compensator having a transformer with its one end connected to an electric power system, and a series circuit constituted by a reactor and a thyristor bulb and connected between the other end of said transformer and the earth, a control apparatus for controlling said static var compensator comprising:
    voltage detection means for detecting a voltage of said electric power system;
    sampling means for sampling the output of said voltage detection means an even number of times for every cycle of said voltage;
    a register for storing samples values of the most recent cycle in an output of said sampling means;
    adder means for adding absolute value of the sampled values in one cycle stored in said register;
    control means for controlling a firing angle of said thyristor bulb in accordance with a deviation of an output of said adder means form an output of a voltage setting device;
    deviation deriving means for obtaining a deviation of an output of said control means from a predetermined value corresponding to a setting var; and
    feedback means for feeding-back an output of said deviation deriving means to an input of said control means.

* * * * *